US012755337B2

(12) United States Patent
Eichhorn et al.

(10) Patent No.: US 12,755,337 B2
(45) Date of Patent: Oct. 6, 2026

(54) AGRICULTURAL MAPPING AND RELATED SYSTEMS AND METHODS

(71) Applicant: Ag Leader Technology, Ames, IA (US)

(72) Inventors: Scott Eichhorn, Ames, IA (US); Tony Woodcock, Ames, IA (US); Bob Heston, Madrid, IA (US)

(73) Assignee: Ag Leader Technology, Ames, IA (US)

( * ) Notice: Subject to any disclaimer, the term of this patent is extended or adjusted under 35 U.S.C. 154(b) by 331 days.

(21) Appl. No.: 18/097,804

(22) Filed: Jan. 17, 2023

(65) Prior Publication Data

US 2023/0230202 A1 Jul. 20, 2023

Related U.S. Application Data

(60) Provisional application No. 63/299,724, filed on Jan. 14, 2022.

(51) Int. Cl.

| | |
|---|---|
| ***G06T 3/4038*** | (2024.01) |
| ***G06T 5/50*** | (2006.01) |
| ***G06T 5/77*** | (2024.01) |
| ***G06T 7/33*** | (2017.01) |
| ***G06T 11/40*** | (2006.01) |

(52) U.S. Cl.

CPC ............. *G06T 3/4038* (2013.01); *G06T 5/50* (2013.01); *G06T 5/77* (2024.01); *G06T 7/337* (2017.01); *G06T 11/40* (2013.01); *G06T 2207/20212* (2013.01); *G06T 2207/30188* (2013.01); *G06T 2207/30252* (2013.01)

(58) Field of Classification Search

None

See application file for complete search history.

(56) References Cited

U.S. PATENT DOCUMENTS

| | | | |
|---|---|---|---|
| 5,264,709 | A | 11/1993 | Kamimura |
| 6,058,343 | A | 5/2000 | Orbach |
| 6,876,920 | B1 | 4/2005 | Mailer |

(Continued)

FOREIGN PATENT DOCUMENTS

| | | | |
|---|---|---|---|
| AU | 2016287397 | B2 | 6/2016 |
| DE | 102009039450 | A1 | 5/2010 |

(Continued)

OTHER PUBLICATIONS

Ashley Napier, Paul Newman, "Generation and Exploitation of Local Orthographic Imagery for Road Vehicle Localisation", 2012, 2012 IEEE Intelligent Vehicles Symposium, pp. 590-596, DOI: 10.1109/IVS.2012.6232165 (Year: 2012).*

(Continued)

*Primary Examiner* — Michael J Cobb

(74) *Attorney, Agent, or Firm* — Dentons Davis Brown; Matthew Warner-Blankenship; Kassandra Rittmer

(57) ABSTRACT

A method for generating a 2D orthomosaic map including obtaining a series of images of a field from a camera located on a ground based vehicle, processing the series of images to mark pixels of the ground based vehicle and optionally an implement, identifying, marking, and removing pixels containing plants, stitching together the series of images into a single map, and reintroducing pixels containing plants into the single map.

19 Claims, 14 Drawing Sheets

(56) References Cited

U.S. PATENT DOCUMENTS

| | | | |
|---|---|---|---|
| 8,230,964 | B2 | 7/2012 | Markfort |
| 8,498,788 | B2 | 7/2013 | Kondekar |
| 9,417,120 | B2 | 8/2016 | Zielke et al. |
| 9,750,173 | B2 | 9/2017 | Dix |
| 9,898,688 | B2 | 2/2018 | Bleiweiss |
| 10,255,670 | B1 | 4/2019 | Wu et al. |
| 10,299,422 | B2 | 5/2019 | Schleicher |
| 10,491,879 | B2 | 11/2019 | Redden |
| 10,845,810 | B2 | 11/2020 | Flajolet et al. |
| 10,912,247 | B2 | 2/2021 | Wolters |
| 11,006,564 | B2 | 5/2021 | Foster |
| 11,093,745 | B2 | 8/2021 | Redden et al. |
| 11,112,262 | B2 | 9/2021 | Anderson |
| 11,212,954 | B2 | 1/2022 | Maeder |
| 2003/0187577 | A1 | 10/2003 | McClure |
| 2004/0004544 | A1 | 1/2004 | Scott |
| 2004/0264761 | A1 | 12/2004 | Mas et al. |
| 2007/0071311 | A1 | 3/2007 | Rovira-Mas et al. |
| 2008/0269956 | A1 | 10/2008 | Dix |
| 2008/0289308 | A1 | 11/2008 | Brubaker |
| 2011/0118926 | A1 | 5/2011 | Peake |
| 2011/0307149 | A1 | 12/2011 | Pighi |
| 2012/0200697 | A1 | 8/2012 | Wuestefeld |
| 2013/0317696 | A1 | 11/2013 | Koch |
| 2014/0116735 | A1 | 5/2014 | Bassett |
| 2015/0321694 | A1 | 11/2015 | Nelson |
| 2015/0359163 | A1 | 12/2015 | Nelson |
| 2016/0018528 | A1 | 1/2016 | Schneider |
| 2016/0229555 | A1* | 8/2016 | Millin .................. G06T 3/4038 |
| 2017/0016870 | A1 | 1/2017 | McPeek et al. |
| 2017/0122740 | A1 | 5/2017 | Schleicher |
| 2017/0249517 | A1* | 8/2017 | Cho .......................... G06T 5/20 |
| 2017/0297621 | A1 | 10/2017 | Bunderson |
| 2018/0017965 | A1 | 1/2018 | Kosa |
| 2018/0068416 | A1* | 3/2018 | Chandra ................ G06T 11/00 |
| 2018/0172838 | A1 | 6/2018 | Junker |
| 2018/0238730 | A1 | 8/2018 | Meier |
| 2018/0252742 | A1 | 9/2018 | Zielke |
| 2019/0343035 | A1 | 11/2019 | Smith |
| 2019/0373801 | A1 | 12/2019 | Schoeny |
| 2020/0021716 | A1 | 1/2020 | Sneyders |
| 2020/0029487 | A1 | 1/2020 | Dix |
| 2020/0033143 | A1 | 1/2020 | Hiramatsu |
| 2020/0084951 | A1 | 3/2020 | Fanshier |
| 2020/0128734 | A1 | 4/2020 | Brammeier |
| 2020/0319655 | A1 | 10/2020 | Desai |
| 2021/0195824 | A1 | 7/2021 | Van Roekel |
| 2021/0289707 | A1 | 9/2021 | Schloesser |
| 2021/0329838 | A1 | 10/2021 | Zielke |
| 2022/0019240 | A1 | 1/2022 | Christiansen |
| 2022/0078975 | A1 | 3/2022 | Slichter |
| 2022/0130145 | A1* | 4/2022 | Connary ................ G05D 1/101 |
| 2022/0232759 | A1 | 7/2022 | Sauder |
| 2022/0386527 | A1 | 12/2022 | Schleicher |
| 2022/0410704 | A1 | 12/2022 | O'Connor |
| 2023/0124026 | A1 | 4/2023 | Hansen |
| 2023/0229163 | A1 | 7/2023 | Rust |
| 2023/0270039 | A1 | 8/2023 | Fanshier |
| 2023/0292647 | A1* | 9/2023 | Bainbridge ........... G06T 7/0016 702/2 |
| 2024/0184299 | A1 | 6/2024 | Baldwin |
| 2024/0224870 | A9 | 7/2024 | Baldwin |
| 2024/0273717 | A1* | 8/2024 | Agarwal ............... G06T 7/0012 |
| 2024/0389494 | A1 | 11/2024 | Vorobiev |
| 2025/0169390 | A1 | 5/2025 | Eichhorn |
| 2025/0241246 | A1 | 7/2025 | Woodcock |
| 2025/0256762 | A1 | 8/2025 | Johnson |
| 2025/0362373 | A1 | 11/2025 | Calderon |
| 2026/0041024 | A1 | 2/2026 | Risius |
| 2026/0083057 | A1 | 3/2026 | Zielke |
| 2026/0084616 | A1 | 3/2026 | Wilson |
| 2026/0150775 | A1 | 6/2026 | Wilson |

FOREIGN PATENT DOCUMENTS

| | | | |
|---|---|---|---|
| JP | 2017211733 | A | 11/2017 |
| JP | 2021101303 | A | 7/2021 |
| NO | 861970 | L | 11/1986 |
| WO | 2012027364 | A2 | 3/2012 |
| WO | 2018055921 | A1 | 3/2018 |
| WO | 2023288249 | A1 | 1/2023 |

OTHER PUBLICATIONS

Anand et al., "AgriSegNet: Deep Aerial Semantic Segmentation Framework for IoT-Assisted Precision Agriculture", IEEE Sensors Journal, 2021, pp. 17581-17590, vol. 21, No. 16.

Bhagat et al., "MS-Net: A CNN Architecture for Agriculture Pattern Segmentation in Aerial Images", 2022, Publisher: Cham: Springer International Publishing.

Imai et al., "Shadow detection in hyperspectral images acquired by UAV", The International Archives of Photogrammetry, Remote Sensing and Spatial Information Sciences, 2019, pp. 371-377.

Innani et al., "Fuse-pn: A novel architecture for anomaly pattern segmentation in aerial agricultural images", 2021.

Shrestha et al., "Automatic Corn Plant Population Measurement Using Machine Vision", Agricultural and Biosystems Engineering Conference Proceedings and Presentations., 2001, No. 37.

Shrestha et al., "Shape and Size Analysis of Corn Plant Canopies for Plant Population and Spacing Sensing", 2005, pp. 295-303.

Tang et al., "Plant Identification in Mosaicked Crop Row Images for Automatic Emerged Corn Plant Spacing Measurement", 2008, pp. 2181-2191.

Thorp et al., "Using Aerial Hyperspectral Remote Sensing Imagery to Estimate Corn Plant Stand Density", 2008, pp. 311-320.

Wolters, D., "Assessment of Corn Plant Population at Emergence from Processed Color Aerial Imagery", 2015.

SunNav, AG400 Gnss Auto-Steering System, Date Unknown—available as early as 2024.

Mike Williams, Google Maps Review; https://web.archive.org/web/20210128011918/https://www.pcmag.com/reviews/google-maps (Year: 2021).

Gao et al., "Towards agricultural autonomy: crop row detection under varying field conditions using deep learning," Sep. 16, 2021, https://arxiv.org/abs/2109.08247 (Year: 2021).

* cited by examiner

AGRICULTURAL MAPPING AND RELATED SYSTEMS AND METHODS

CROSS-REFERENCE TO RELATED APPLICATION

This application claims the benefit under 35 U.S.C. § 119(e) to U.S. Provisional Application 63/299,724, filed Jan. 14, 2022, and entitled Agricultural Mapping, which is hereby incorporated herein by reference in its entirety for all purposes.

TECHNICAL FIELD

The disclosed technology relates generally to agricultural mapping, and more specifically, to various technologies for the generation of orthomosaic 2D agricultural field maps using one or more ground vehicle cameras mounted to an agricultural vehicle.

BACKGROUND

Orthomosaic maps provide valuable information to growers and agronomists that allow them to make decisions about crop management throughout the growing season. Certain approaches provide analytical services that can count plant population, detect plant stress, and make nitrogen recommendations.

These maps are currently generally generated by satellite or aerial imagery, however, and numerous complications may be encountered when attempting to gather and process this type of imagery. For example, cloud cover interferes with satellite imaging and wind conditions can prevent operation of manned or unmanned aircraft. Further, many portable unmanned aircraft have limited flight time due to the charge capacity of their battery packs and strong winds. Further, manned or unmanned aircraft imagery operations are in addition to the normal field operations currently performed and as such incur additional time and labor.

Further, various known approaches for processing imagery utilize perspective effects to estimate a 3D model of a field. Some of these known approaches include use of stereo cameras for acquiring additional depth detail. It is computationally expensive to process all this information for an entire agricultural field. Further, the generated 3D information is also unnecessary for many types of orthomosaic map analysis.

The expense and effort involved in gathering and processing satellite or aerial imagery and/or generating 3D models prevents most growers from imaging their fields. There is a need in the art for an improved approach to field imagery and analysis.

There is a need in the art for a method of capturing accurate, high-resolution 2D maps of plants in a field that avoid these issues.

BRIEF SUMMARY

Discussed herein are various devices, systems and methods relating to generating 2D agricultural field maps using ground vehicle cameras.

In various implementations, the disclosed system relates to the capturing and recording of a series of images of plants in a field and stitching the images together to create an orthomosaic map to produce a map containing clear, undistorted images of each individual plant in the field for use by an operator.

Various implementations of the system for imaging processes that can be used with software and hardware to effectuate the described imaging, stitching and mapping processes. In certain implementations, the system includes one or more cameras that capture images and a processor that performs image processing tasks such as alignment and stitching. The processor can be implemented as a general-purpose CPU or a specialized image processing chip.

In various Examples, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In Example 1, a system for generating a 2D orthomosaic map of a field, comprising at least one camera mounted to an ground vehicle, and a processing unit, wherein the processing unit is configured to record image data from the at least one camera, pre-process the recorded image data by identifying and removing or adjusting obstruction pixels and/or shadow pixels, process the pre-processed image data by stitching the pre-processed image data into an orthomosaic field map.

In Example 2, the system of Example 1, wherein the processing unit is further configured to remove plant pixels prior to stitching and fill the stitched image data with the plant pixels after stitching.

In Example 3, the system of Example 1 or 2, further comprising buffering a log of unaltered images.

In Example 4, the system of any of the preceding Examples, further comprising incorporating metadata into the image data and 2D orthomosaic map.

In Example 5, the system of any of the preceding Examples, wherein the metadata is at least one of IMU metadata, GNSS metadata, timestamp metadata, and GPS metadata.

In Example 6, the system of any of the preceding Examples, wherein the identification and removal of obstruction and/or shadow pixels is performed via hue, saturation, and luminance (HSV) thresholds.

In Example 7, the system of any of the preceding Examples, wherein the stitching of the pre-processed image data comprises identifying features in the image data.

In Example 8, a method for generating a 2D orthomosaic map comprising obtaining a series of images of a field from a camera located on a ground-based vehicle, processing the series of images to mark pixels showing of the ground-based vehicle, identifying, marking, and removing pixels showing plants, stitching together the series of images into a single map, and reintroducing pixels containing plants into the single map.

In Example 9, the method of any of the preceding Examples, further comprising identifying and marking pixels in shadow.

In Example 10, the method of any of the preceding Examples, wherein pixels in shadow are identified by relative luminance value.

In Example 11, the method of any of the preceding Examples, further comprising removing the pixels in shadow from the ground-based vehicle.

In Example 12, the method of any of the preceding Examples, further comprising recording metadata including one or more of inertial measurement unit (IMU) data, global navigation satellite systems (GNSS) data, vehicle orientation data, time data, and weather data with the series of images.

In Example 13, the method of any of the preceding Examples, further comprising removing the pixels showing the ground-based vehicle.

In Example 14, the method of any of the preceding Examples, further comprising identifying a portion of an image from the series of images containing an overhead view of a plant and using the pixels shows plants from that portion of the image for reintroducing pixels containing plants into the single map.

In Example 15, a method for creating a field map comprising recording image data from a camera on a ground-based vehicle, preprocessing the image data comprising identifying and marking pixels as plant pixels, vehicle pixels, and shadow pixels, removing vehicle pixels and shadow pixel, and adjusting pixels, processing the image data comprising removing plant pixels, stitching the image data into a map, filling the map with plant pixels, saving the map for analysis.

In Example 16, the method of any of the preceding Examples, further comprising recording metadata from the ground-based vehicle and the camera with the image data, the metadata including one or more of inertial measurement unit (IMU) data, global navigation satellite systems (GNSS) data, vehicle orientation data, time data, and weather data.

In Example 17, the method of any of the preceding Examples, further comprising buffering the image data to maintain altered and unaltered copies of the image data.

In Example 18, the method of any of the preceding Examples, wherein plant pixels are identified by their hue, saturation, and luminance values (HSV).

In Example 19, the method of any of the preceding Examples, further comprising identifying a portion of an image from the image data containing an overhead view of a plant and using the plant pixels that portion of the image data for filling the map with plant pixels.

In Example 20, the method of any of the preceding Examples, wherein shadow pixels are identified by a luminosity pattern.

Example 21 relates to a method for generating a 2D orthomosaic map. The Example also includes obtaining a series of images of a field from a camera located on a ground-based vehicle, processing the series of images to mark pixels of the ground-based vehicle, identifying, marking, and removing pixels containing plants, stitching together the series of images into a single map, and reintroducing pixels containing plants into the single map.

In further implementations, the system uses software to perform the image processing tasks. The software can be executed on a general-purpose computer or a specialized image processing device. Examples of hardware components that can be used in the system include cameras, processors, memory devices, and communication interfaces. Examples of software components that can be used in the system include image alignment algorithms, image prepprocessing, filtering and stitching algorithms, and user interface software.

In further implementations, the system uses a combination of hardware and software to perform the imaging processes. For example, the system can use a camera module to capture images and a specialized image processing chip to perform alignment and stitching tasks. The system can also use software to provide additional functionality such as image enhancement and 2D reconstruction.

The system can be implemented as a standalone device, system and/or method, or be integrated into existing systems. The system can be controlled via a graphical user interface or an application programming interface (API). The system can be configured to operate in real-time or near-real-time modes.

Other embodiments of these Examples include corresponding computer systems, apparatus, and computer programs recorded on one or more computer storage devices, each configured to perform the actions of the methods.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
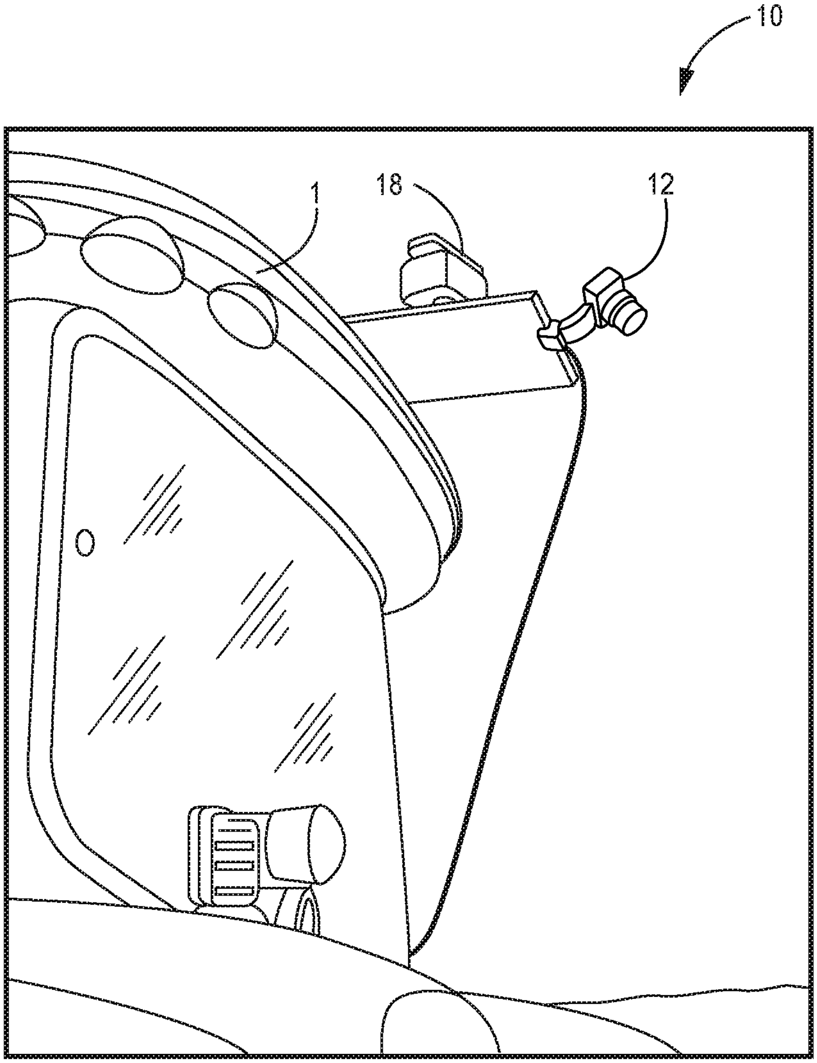
FIG. 1 is a perspective view of the front of an agricultural vehicle having a camera mounted thereto, according to certain implementations.

Georeferenced, orthomosaic imagery of plants in the field can be analyzed to determine the health, growth stage, and precise location of each individual plant. The health and growth stage information can be used to inform crop management decisions during the growing season, while plant location and poor spacing information can highlight problems in the planting hardware and be used to correct the equipment prior to the next planting season. A distorted image of the plant will interfere with the accurate measurement of these qualities.

The various embodiments disclosed or contemplated herein relate to systems, methods, and devices for generating such clear orthomosaic maps, such as 2D orthomosaic maps using one or more cameras mounted to a ground vehicle, such as an agricultural vehicle. In various implementations, the system operates while the ground vehicle performs other field operations, such as planting, spraying, harvesting, and the like. In certain implementations, the system records a series of images of a region of interest (ROI) such as a field and stitches the images/image data together to produce the final map. Various implementation further include optional pre-processing steps that allow for the removal of obstructions, shadows and the like.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. Pat. No. 11,277,961, issued Mar. 22, 2022, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 11,064,653, issued Jul. 20, 2021, entitled "Agricultural Systems Having Stalk Sensors and/or Data Visualization Systems and Related Devices and Methods," U.S. Pat. No. 11,297,768, issued Apr. 12, 2022, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 17/226,002 filed Apr. 8, 2021, and entitled "Apparatus, Systems and Methods for Stalk Sensing," U.S. Pat. No. 10,813,281, issued Oct. 27, 2020, entitled "Apparatus, Systems, and Methods for Applying Fluid," U.S. patent application Ser. No. 16/371,815, filed Apr. 1, 2019, entitled "Devices, Systems, and Methods for Seed Trench Protection," U.S. Patent Application 16,523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 15, 2019, entitled "On-The-Go Organic Matter Sensor and Associated Systems and Methods," U.S. Pat. No. 11,523,554, issued Dec. 13, 2022, entitled "Dual Seed Meter and Related Systems and Methods," U.S. patent application Ser. No. 16/891,812, filed Jun. 3, 2020, entitled "Apparatus, Systems and Methods for Row Pre-processer Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed Apr. 19, 2022, entitled "Automatic Steering Systems and Methods," U.S. patent application Ser. No. 17/742,373, filed May 11, 2022, entitled "Calibration Adjustment for Automatic Steering Systems," U.S. patent application Ser. No. 17/902,366, filed Sep. 2, 2022, entitled "Tile Installation System with Force Sensor and Related Devices and Methods," U.S. patent application Ser. No. 17/939,779, filed Sep. 7, 2022, entitled "Row-by-Row Estimation System and Related Devices and Methods," U.S. patent application Ser. No. 18/081,432, filed Dec. 14, 2022, entitled "Seed Tube Guard and Associated Systems and Methods of Use," U.S. patent application Ser. No. 18/087,413, filed Dec. 22, 2022, entitled "Data Visualization and Analysis for Harvest Stand Counter and Related Systems and Methods," U.S. Patent Application 63/302,824, filed Jan. 25, 2022, entitled "Seed Meter with Integral Mounting Method for Row Crop Planter," U.S. Patent Application 63/303,144, filed Jan. 26, 2022, entitled "Load Cell Backing Plate," U.S. Patent Application 63/315,850, filed Mar. 2, 2022, entitled "Cross Track Error Stalk Sensor," U.S. Patent Application 63/346,665, filed May 27, 2022, entitled "Seed Delivery Tube Camera for Furrow Monitoring," U.S. Patent Application 63/351,602, filed Jun. 13, 2022, entitled "Apparatus, Systems and Methods for Image Plant Counting," U.S. Patent Application 63/357,082, filed Jun. 30, 2022, entitled "Seed Tube Guard," U.S. Patent Application 63/357,284, filed Jun. 30, 2022, entitled "Grain Cart Bin Level Sharing," U.S. Patent Application 63/394,843, filed Aug. 3, 2022, entitled "Hydraulic Cylinder Position Control for Lifting and Lowering Towed Implements," U.S. Patent Application 63/395,061, filed Aug. 4, 2022, entitled "Seed Placement in Furrow," U.S. Patent Application 63/400,943, filed Aug. 25, 2022, entitled "Combine Yield Monitor," U.S. Patent Application 63/406,151, filed Sep. 13, 2022, entitled "Hopper Lid with Magnet Retention and Related Systems and Methods," and U.S. Patent Application 63/427,028, filed Nov. 21, 2022, entitled "Stalk Sensors and Associated Devices, Systems and Methods".

Turning to the figures in further detail, the mapping system 10 described herein is capable of using one or more cameras 12 mounted to a ground vehicle 1. In various implementations, the ground vehicle 1 and cameras 12 operate while performing normal field operations, and as such greatly reduce the difficulty, including time and expense, of acquiring imagery for use by the system 10, as would be understood.

Figure 2:
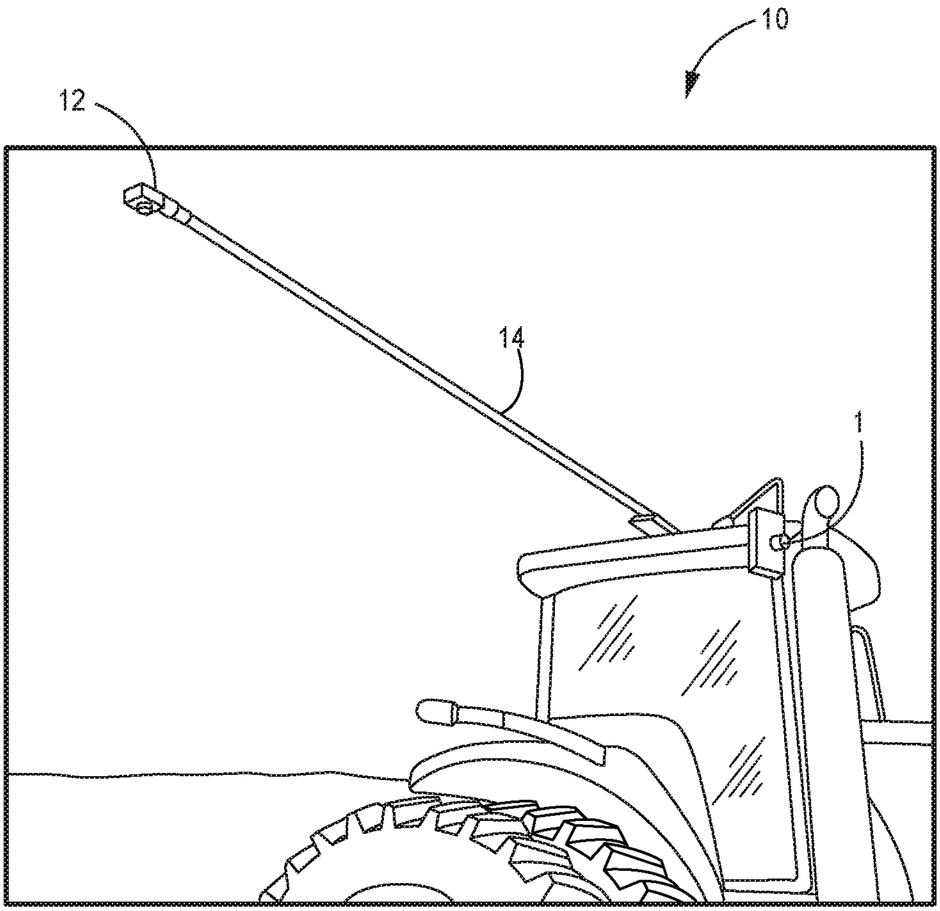
FIG. 2 is a perspective view of the side of an agricultural vehicle having a camera mounted to a boom, according to certain implementations.
Figure 3:
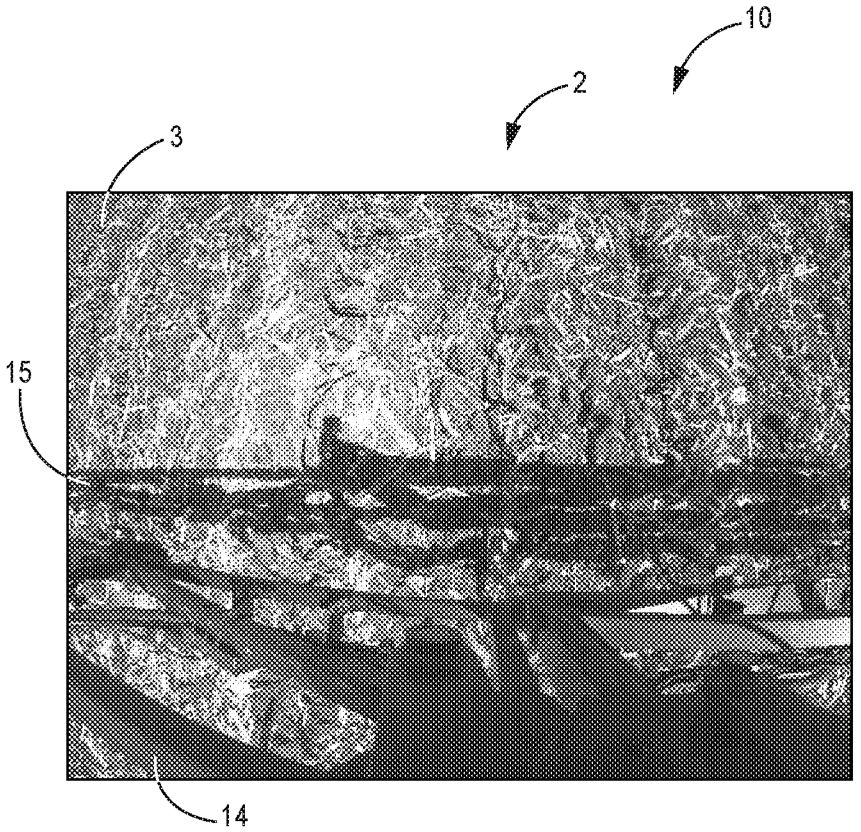
FIG. 3 is a reward-facing view of the front of an agricultural vehicle having a camera mounted thereto, according to certain implementations.

FIGS. 1-3 depict various implementations of the system 10 illustrating certain of the possible mounting locations of the one or more cameras 12 on a ground vehicle 1, such as a tractor 1. In various implementations of the system 10, one or more cameras 12 may be mounted behind (to the rear) the tractor 1 (FIG. 1), beside the tractor 1 (FIG. 2), including on a boom 13 extending from the tractor 1, and/or on an implement 14, such as a spray boom 14 (FIG. 3). Those of skill in the art would appreciate that further placements are contemplated by alternate implementations, and that a combination of mounting locations for one or more cameras 12 is of course possible, with certain locations being used and others omitted depending on the specific implementation.

Figure 4:
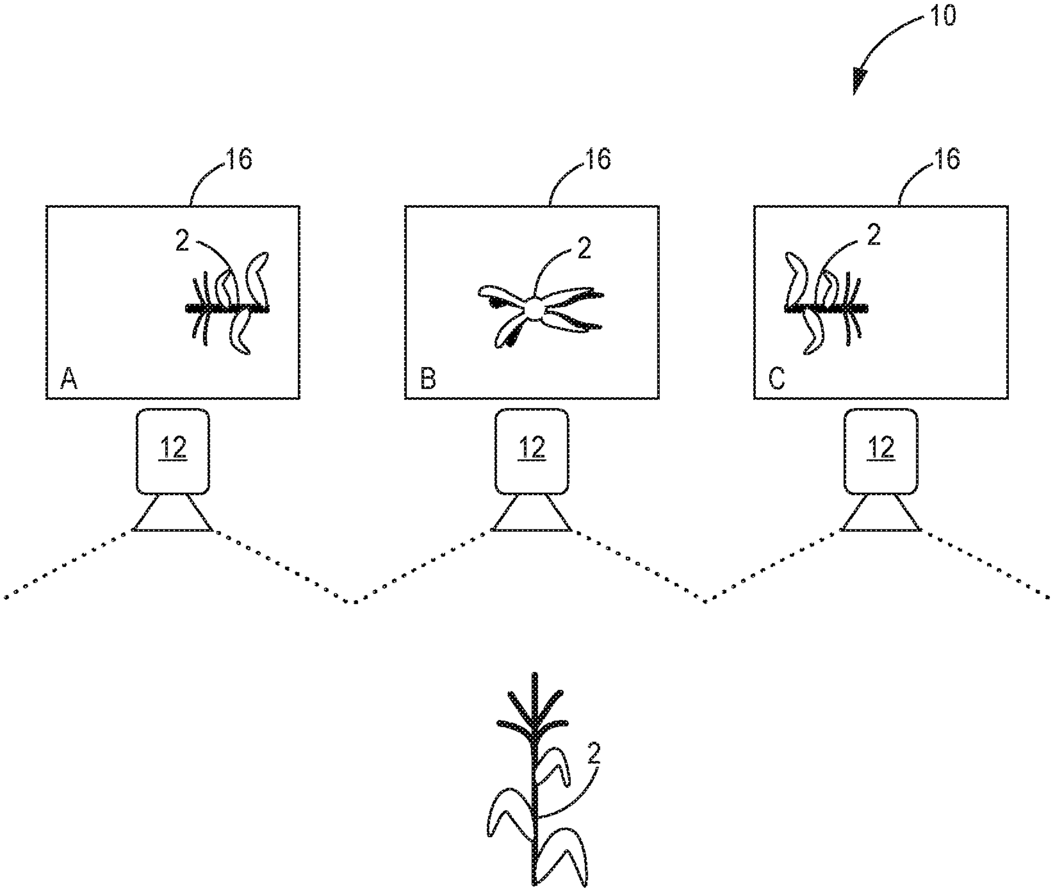
FIG. 4 is a schematic view of the acquisition of several images of a plant via a plurality of cameras, according to certain implementations.

One challenge faced when using ground vehicles 1 to acquire imagery not seen by aerial imaging systems is perspective. Especially when plants are more than a few inches tall. For example, FIG. 4 shows one example of how a downward-facing camera 12 mounted near the ground 3 captures/acquires multiple images 16 of plants 2, each from a different perspective, of the same corn plant when passing overhead, shown at A, B, and C.

Figure 5:
FIG. 5 (PRIOR ART)
FIG. 5 is a representative image of plants showing blurriness/ghosting.

These differing perspectives can result in blurry and "ghosted" semi-transparent images of the plant 2 when creating an overhead map by stitching images together using prior known techniques, as shown for example in FIG. 5. For example, in stitched images like that of FIG. 5, while the plant(s) 2 are blurry or ghosted, the soil and crop residue on the ground typically do not exhibit blurriness or ghosting because they are relatively flat surfaces and as such appear the same in each image 16.

An additional challenge when gathering imagery 16 using ground vehicles 1 is that a portion of the vehicle 1/implement 14 structure and/or shadow 15 may appear in the frame (as is shown for example in FIG. 3). It would be appreciated that during a straight pass through the field, these vehicle 1/implement 14 parts and shadows 15 will remain in the same, or substantially the same, location in each frame of the imagery. This repetition can interfere with the pattern-matching algorithms of various photogrammetry software—such as that of Pix4Dmapper and similar—when attempting to stitch images together.

A still further challenge may include changes to the relative position between the camera 12 and the ground due to motion of the suspension and inertial force. The motion and forces can lead to inaccuracies in an estimated camera 12 position and alter the field of view of the camera. The relative motion and related inaccuracies can become large, especially on flexible structures like a sprayer boom.

The disclosed implementations of the system 10 address the limitations and shortcomings of prior art approaches to stitching and compiling an overall map by, in certain aspects, removing the various views of the plants of interest prior to stitching and then then re-introducing the plant images into the stitched image as though they were imaged overhead. These approaches of the system 10 and more will be described herein in relation to the figures.

The disclosed system 10 and method also improve upon the limitations in the state of the art by first removing pixels common to images from ground vehicles that hamper the effectiveness of the stitching algorithm (i.e. plants, vehicle/implement structure, and vehicle/implement shadow). This removal results in a more accurate and less computationally expensive stitched orthomosaic map. However, it is appreciated that this process removes the subjects of interest—the plants—so a further improvement in the process reintroduces a single, georeferenced, undistorted view of each plant into the resulting map. As such, the final maps generated by the disclosed system offer a similar perspective to those generated from aerial imagery while providing higher resolution from comparable imaging hardware, and being gathered during normal ground field operations.

As an illustrative example, it will be appreciated that in various implementations, the final map can be rendered at a higher resolution than would be the case for maps generated from an ariel camera, such as a drone, as a drone needs to take, for example, hundreds of images to image a field, while the present implementations would need to take thousands of images when the same camera is mounted on a ground vehicle because each captured image captures a relatively small portion of the field. When this greater number of higher-resolution images are stitched together, the mosaic is consequently composed of thousands of images will be higher resolution, even if the source camera(s) are of a lower native resolution.

Figure 6:
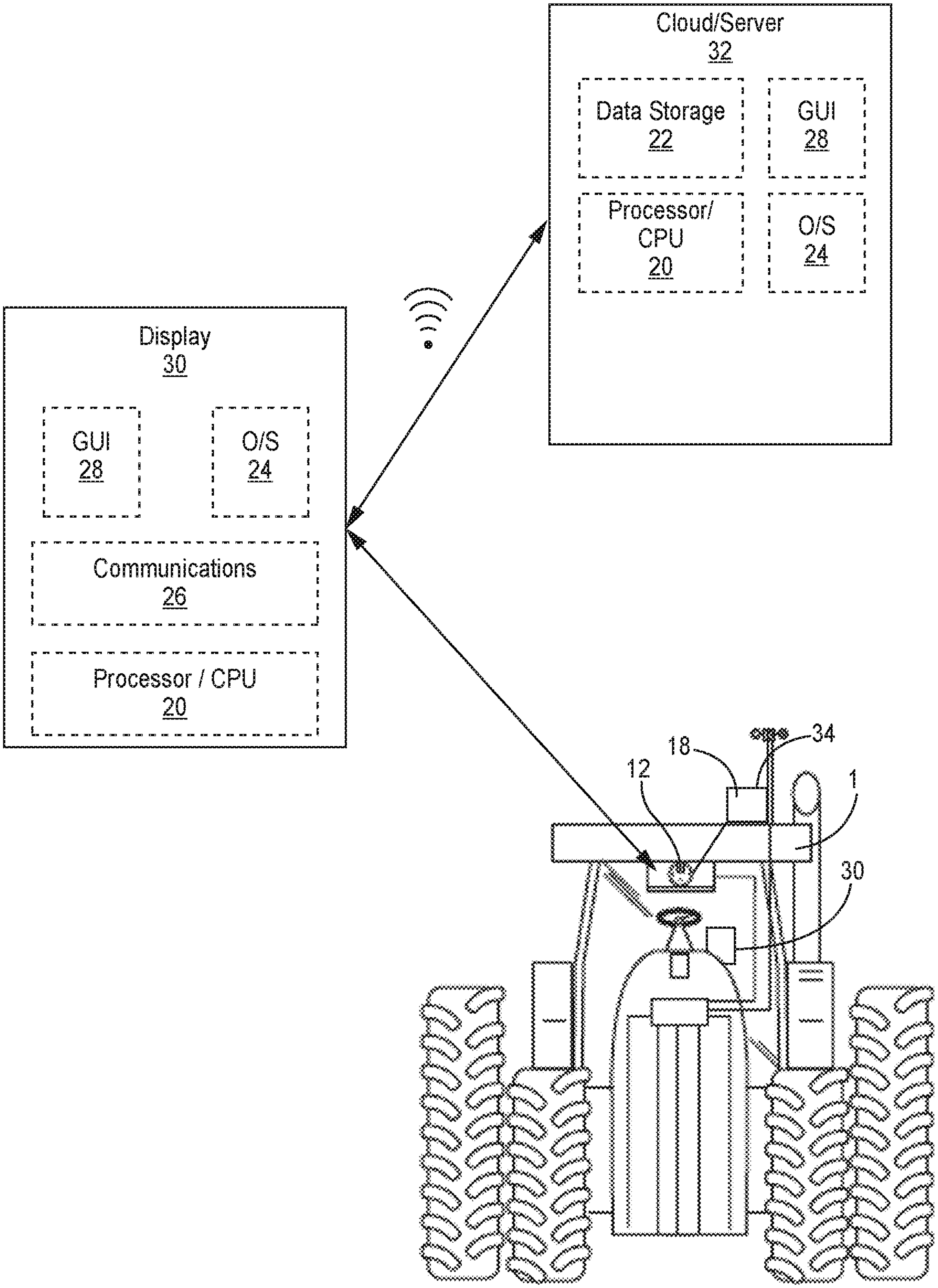
FIG. 6 is a system diagram showing several components, according to certain implementations.

Turning now to FIG. 6, in various implementations the system 10 disclosed herein includes an architecture of various hardware, software, and/or firmware components constructed and arranged to perform the operations and actions discussed herein, as would be readily appreciated. In certain implementations, the various processing and computing components necessary for the operation of the system 10 include components for receiving, recording, and processing the various received signals and imagery, generating the requisite calculations and commanding the various hardware, software, and firmware components necessary to effectuate the various processes described herein.

In certain implementations, system 10 comprises at least one camera 12, and in certain implementations a plurality of camera(s) 12, configured to capture or acquire images as image data, as described above. It is understood that in use according to certain implementations, the images 16/image data 16 are captured/acquired and recorded as a time-series or data set for processing, and that certain metadata can be incorporated into the stored image data, as will be apparent from the description herein.

In various implementations, a processor 20 or central processing unit (CPU) 20 that is in communication with the camera(s) 12. The CPU 20 is also in communication with, for example, a non-volatile memory 22 or other data storage component 22 and an operating system 24 or software and sufficient media to effectuate the described processes, as well as other known components necessary for the effectuation of the described processes. In any event, in various implementations, the processor 20 can be used with an operating system 24, a non-volatile memory 22/data storage 22, and the like, as would be readily appreciated by those of skill in the art. It is appreciated that in certain implementations, the data storage 22 and processor 20 can be local, such as on a display 30, the cloud 32, or some combination thereof, as would be understood.

In various implementations, the system 10 can comprise a circuit board, a microprocessor, a computer, or any other known type of processor 20 or CPU 20 that can be configured to assist with the operation of the system 10, as would be readily understood. In further embodiments, a plurality of CPUs 20 can be provided and may be operationally integrated with one another and various components of other systems on the vehicle 1 or used in connection with the vehicle 1 or agricultural operations, as would be appreciated. Further, it is understood that system 10 and/or its processors 20 can be configured via programming or software to control and coordinate the recordings from and/or operation of various cameras 12 and data logging components, as would be readily appreciated.

Further implementations of the system 10 include a communications component 26. The communications component 26 is configured for sending and/or receiving communications to and from one or more of vehicles 1, cameras 12, a GNSS 18, and the like, as would be appreciated.

In certain implementations, the various components of the system 10 are housed within or otherwise are in operative communication with a display 30, such as the InCommand® display from Ag Leader®. In various implementations, the display 30 is located in the cab of the vehicle 1, as shown in FIG. 6, but in alternative implementations the display 30 may also be located off-site and in communication with the vehicle 1 and cameras 12 via a wireless connection, as would be understood. In various further implementations, certain components of the system 10 may be located remotely from the vehicle 1, such as in the cloud 32 or other server, as would be appreciated.

In further implementations, the display 30 optionally includes a graphical user interface (GUI) 28 and optionally a graphics processing unit (GPU). In these and other implementations, the GUI 28 and/or GPU allows for the display of information to a user and optionally for a user to interact with the displayed information, as would be readily appreciated. It would be understood that various input methods are possible for user interaction including but not limited to a touch screen, various buttons, a keyboard, or the like.

In certain implementations, an inertial measurement unit (IMU) 34, optionally including one or more of an accelerometer and a gyrometer (not shown) is provided and in operational communication with the camera(s) 12 and/or vehicle 1 for use in providing information about the relative instantaneous position and/or movement of the camera(s) 12, vehicle 1 and any other implements relative to the subject(s) of the captured images 16, as is described further herein.

Figure 7:
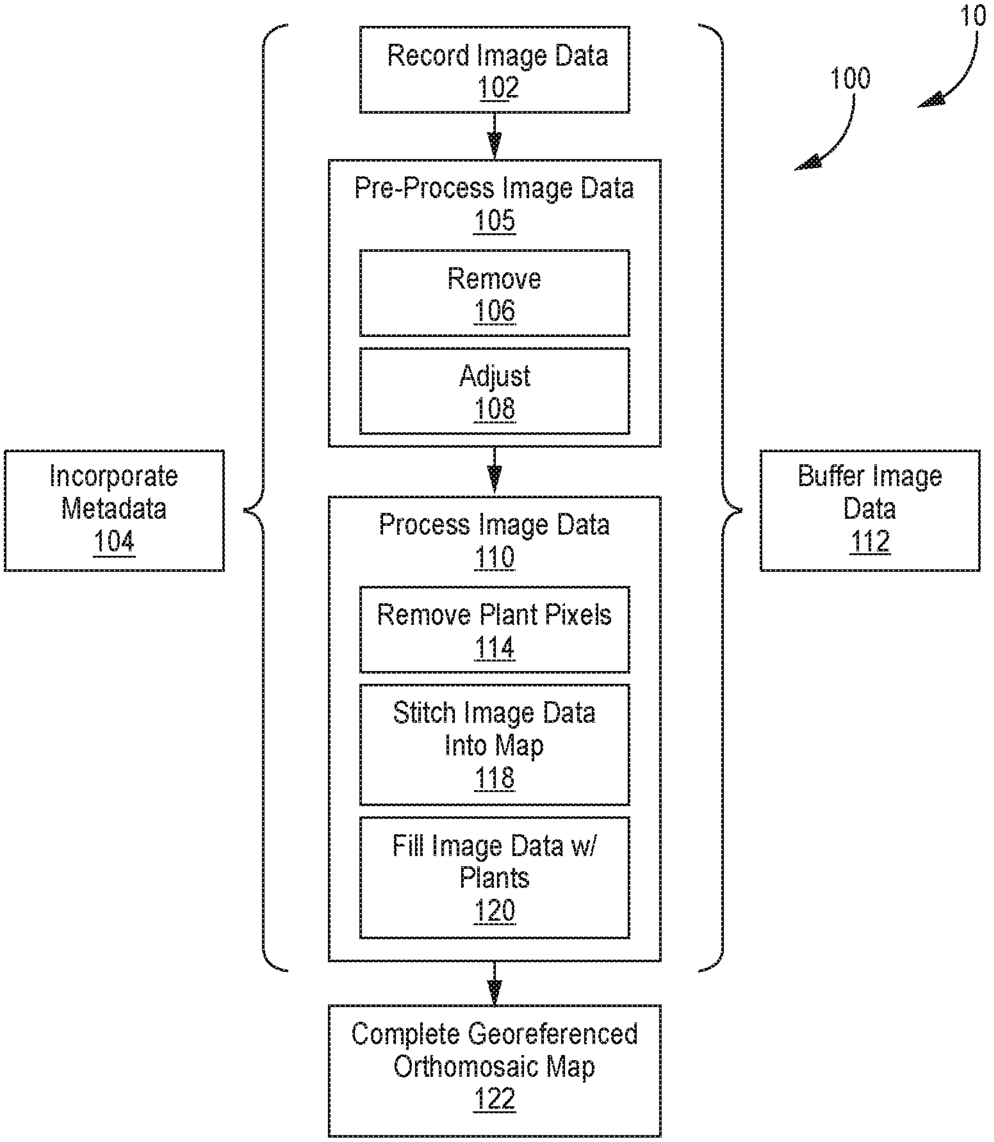
FIG. 7 is a process flow chart showing several optional steps and sub-steps of the disclosed system, according to certain exemplary implementations.

Continuing with FIG. 7, in various implementations the system 10 is configured to execute a series of steps and sub-steps. Each of the steps and sub-steps is optional and may be performed in any order, or not at all, as would be readily appreciated. Various steps may be performed iteratively or at multiple times, as would be understood.

FIG. 7 describes an exemplary process 100 of the system 10 implemented by the components and software described above for combining individual image frames into a larger 2-D geo-referenced image map (shown at box 122). Generally, in various implementations, the process 100 is configured to record (box 102), pre-process (box 105) and process (box 110) image data to produce an orthomosaic 2-D geo-referenced image map (shown at box 122).

While this implementation is exemplary, it in no way limits the scope of the contemplated system 10 and process 100.

For example, in certain implementations, the process takes place in real-time or near real-time on-board the imaging vehicle 1. In an alternative implementations, the process is conducted at a later time either on-board the imaging vehicle 1, remotely in the cloud 32, at desktop computer, mobile device/tablet or the like, or a combination of the foregoing, as would be understood.

In one optional step, the system 10 records imagery from the cameras 12 (box 102) or otherwise obtains ground based imagery via the one or more camera(s) 12 mounted on the ground vehicle 1 and via the other operations and processing systems discussed in detail above, as would be readily appreciated. In exemplary implementations, the recorded image data is recorded in transitory or permeant memory as a series of image data, as would be readily appreciated.

In another optional step according to certain implementations, the system 10 optionally also records metadata (box 104) such as GNSS 18/GPS position information, IMU 34 data or the like while recording imagery via the operations components discussed above. In a still further implementation, the recorded imagery (box 102) includes location information, such as via the metadata or other system for collating the image data with location/time data understood in the art. It is appreciated that further metadata can also be incorporated with the series of image data in alternate implementations, such as data from the IMU 34 or other sensing or tracking device.

It is understood that in various implementations the metadata can be used for a variety of functions. For example, the metadata can be used by the system 10 to provide image context in time and space, that is for mapping and record-keeping purposes. A further function is to provide the system 10 and user with certain characteristics about the vehicle 1 and environment, such as vehicle orientation and sun position for shadow removal.

As an illustrative example, in certain implementations utilizing metadata (box 104), the GNSS 18, inertial measurement unit 34, or other sensor that calculates vehicle heading can be used to detect when the vehicle 1 and camera 12 orientation change relative to the sun (box 110). This metadata, optionally including the time of day, may be utilized by the system 10 in updating the shadow 15 removal algorithm.

Continuing with FIG. 7, in another optional step, the system 10 is configured to pre-process the image data (generally at box 105), that is to remove irrelevant image data (such as images of the vehicle and other equipment) or adjust to the image data to account for predictable irregularities, such as the presence of shadows in the region of interest, which as would be understood both move-slowly over time as the vehicle moves in a single direction and suddenly when the vehicle turns.

Figure 8A:
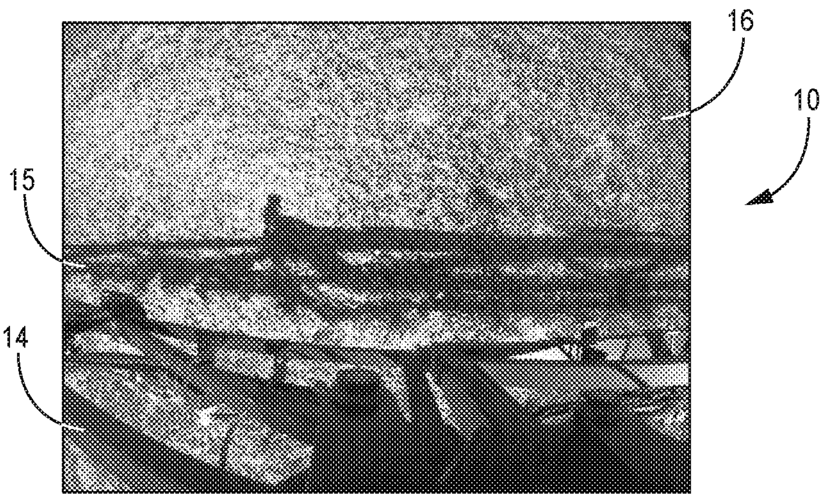
FIG. 8A is a view of a captured image of the plants in a field, according to one implementation.
Figure 8B:
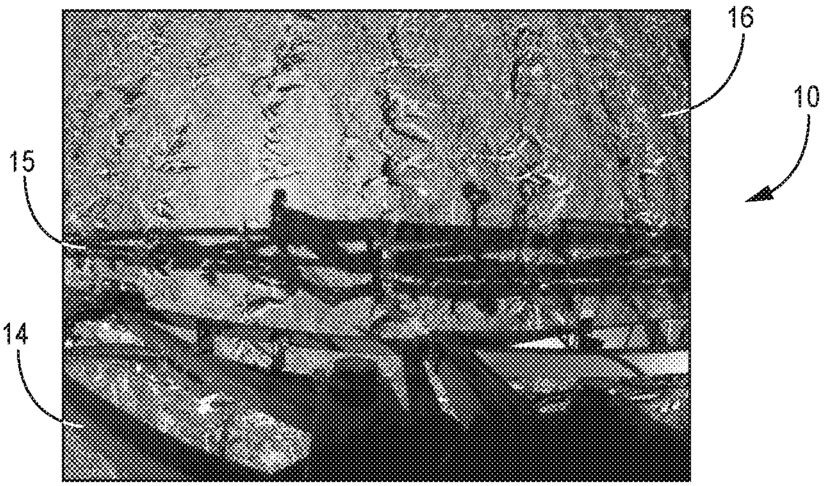
FIG. 8B is a view of a captured image of the plants in a field, according to one implementation.
Figure 8C:
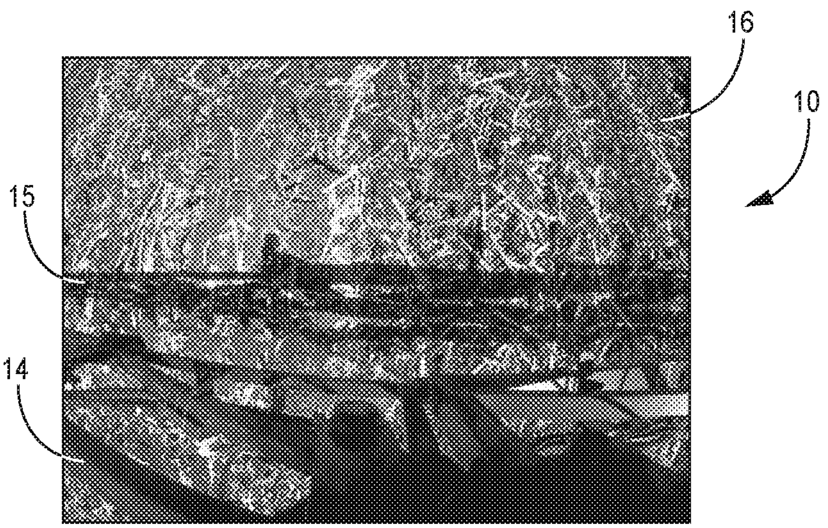
FIG. 8C is a view of a captured image of the plants in a field, according to one implementation.

For example, FIGS. 8A-C show multiple frames of an implement 14 structure and shadow 15 from imagery 16 gathered while a ground based vehicle 1 passed through a field. It can be seen that the location of the shadow 15 and implement 14 remain substantially the same in each frame, while the plants including the plants of interest (crops) and other features such as soil move.

Figure 9:
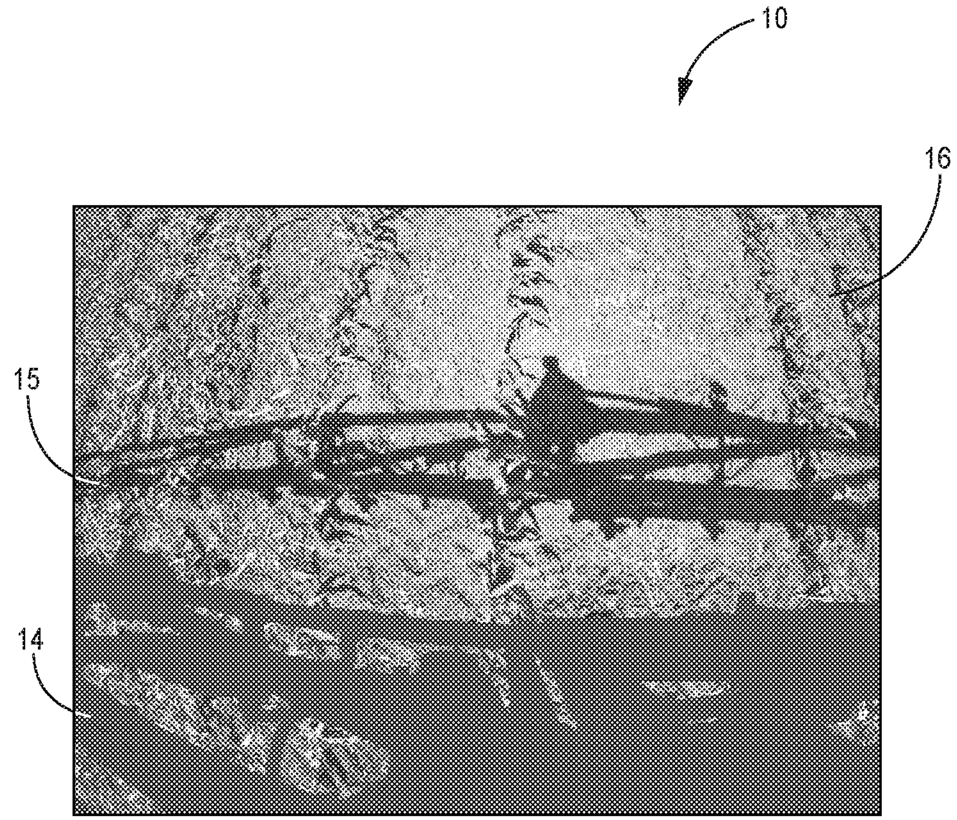
FIG. 9 is a view of a captured image of the plants in a field where the portions of the image related to the vehicle have been removed during pre-processing, according to one implementation.

FIG. 9 shows processed imagery 16 where the implement 14 structure is identified and removed from the image, here shown by marking the pixels in a contrasting color. As would be understood, the pixels implement 14 structure may be identified through changes or differences in measured color/HSV. It would be appreciated that the pixels or portions of the imagery 16 to be removed can be marked or removed via any appreciated technique including classifying those pixels/portions as transparent. As would be understood, pixels containing structure of the ground based vehicle 1 may similarly be identified through changes or differences in measured color/HSV.

Figure 10:
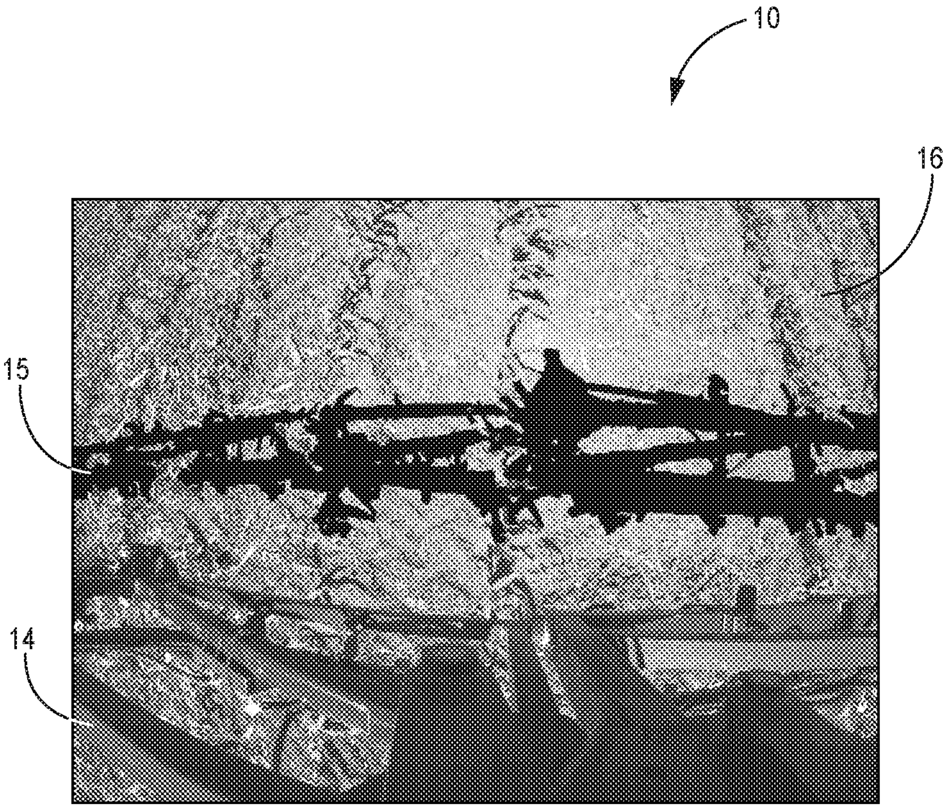
FIG. 10 is a view of a captured image of the plants in a field where the portions of the image related to the shadow have been removed during pre-processing, according to one implementation.

Further, FIG. 10 shows processed imagery 16 where the shadow 15 is identified and removed from the image, here shown by marking the pixels in a contrasting color. It would be appreciated that the pixels or portions of the imagery 16 to be removed can be marked or removed via any appreciated technique including classifying those pixels/portions as transparent, as would be readily appreciated.

Returning to FIG. 7, in various pre-processing sub-steps, the system 10 is configured to isolate and remove irrelevant portions of the captured image data. That is, in certain implementations, the system 10 via the processor and other components and modules is configured to identify and remove those pixels/portions of the imagery that include portions of the vehicle 1 and/or implement 14 (box 106). In certain of these implementations, vehicle 1 and/or implement 14 pixels are identified using certain defined characteristics, such as color differences, contrast edge detection, or other recognized methods. It is appreciated that these defined characteristics can be established via the user or programmed into the software executed by the system, and that in various implementations these defined characteristics can be updated and adjusted over time.

In another implementation, rather than identifying the specific pixels comprising the vehicle 1 and/or implement 14, the portion of the imagery where the structure appears is ignored or removed, including the ground/plants in that portion of the imagery. In various implementations, it would be appreciated that if the camera 12 is fixed to the same structure that is visible in the image frame no or minimal relative motion would be expected.

In some implementations, static objects in the frame, such as some implement 14 or vehicle 1 structures, may be removed by defining which pixels are occupied in the frame by the static object to be removed. Optionally, for a predefined mounting location on a known structure, these pixels could be defined prior to camera installation.

In implementations where the structure—implement 14 or vehicle 1 component—may move in the camera's field of view, such as the motion of the front wheel or the position of a sprayer boom, these pixels could be identified and removed by comparing successive frames during vehicle motion and identifying the pixels with HSV values/ranges that remain nearly constant during successive frames, unlike the moving ground surface.

In various further implementations, an image recognition system could also be trained to identify the pixels of the expected structures in the camera field of view for removal.

In a further implementations, other types of analysis, such as background subtraction in OpenCV, can be conducted to identify which pixels change the least in the image frame during a field pass and those pixels are removed. Various thresholds for background subtraction are possible and would be recognized by those of skill in the art. An example is described in Migdal, J. and Grimson, E., Background Subtraction Using Markov Thresholds, Computer Science and Artificial Intelligence Laboratory, Massachusetts Institute of Technology, incorporated herein by reference.

In various implementations, identification and removal of various pixels can be done by using a range of hue, saturation, and luminance (HSV). In various implementations, the HSV range is one or more fixed values. Alternatively the HSV range may be dynamic and adjusted based on various characteristics or conditions. The HSV range of the identified foliage can then be used to define the HSV range of plant pixels to be selected and removed in future images.

In various further implementations, the ambient lighting condition can be evaluated and used to select a corresponding range of HSV values that would be associated with plant foliage under that specific lighting condition. This corresponding foliage color HSV range can be based on a look-up table or other deterministic method or threshold, as would be appreciated.

In certain implementations, the ambient lighting condition is determined by imaging a surface of a known color(s) such as a Macbeth chart, gray balance chart, or white balance filter.

Additionally or alternatively, identification and removal of various pixels may be done by use an image recognition system trained to identify plant foliage based on shape alone or in combination with other characteristics.

In another optional pre-processing step, the system 10 removes (box 106) or adjusts (box 108) for shadows 15 from the imagery 16. That is, the system 10 accounts for the fact that in certain implementations the plants 2 and terrain 3 under a shadow 15 are still imaged, only at lower luminosity. Similar to the above discussion recognizing the location of an implement 14 or vehicle 1 component in imagery 16, the system 10 may analyze one or more frames of the gathered imagery 16 to identify a pattern of lower luminosity roughly fixed in the frames, shown for example in FIGS. 8A-C. The pattern/location of the shadow 15 can then be identified and those pixels/portions of the imagery 16 marked for removal and/or as transparent, as shown for example in FIG. 10.

Again, it is appreciated by one of skill in the art that while the location of certain vehicle 1 components will remain relatively unchanged over time, the size and position of shadows 15 may (and typically will) change over time and as the vehicle 1 moves through the field, and the system 10 is therefore configured to identify and pre-process (box 105) the portions of the image 16 impacted variously by a given shadow 15 over time, as would be appreciated.

In certain implementations, only those pixels that are shaded by the vehicle 1 or implement 14 are removed and not those pixels that are shaded by static objects such as plants. As would be appreciated, plant shadows are distinctive image features that can be used to aid in the image-stitching process (box 118) discussed further herein, and may be retained in the imagery.

Pixels of shaded objects consistently display lower luminance values than the same objects when not in shade in the HSV color space. One exemplary approach to identifying these shaded areas is to locate areas of the image where the pixel luminance values are consistently lower than the average luminance of pixels in the overall image or the luminance of pixels in the local region of the image.

Alternately, for a known camera mounting location and structure arrangement shaded pixels can be identified and removed based on the vehicle's 1 or implement's 14 orientation combined with the sun's position. As is generally understood, the sun will cast a shadow in a known direction and will be recorded in an image within a known range of pixels.

In another optional step, a buffer (shown generally at box 112) of original and processed images is maintained along a parallel path during pre-processing (generally at box 105) and processing (generally at box 110). That is, in the above mentioned steps when certain pixels/portions of the imagery 16 are removed/marked the original imagery is not altered but rather a copy of the imagery is altered or vice versa.

Figure 11A:
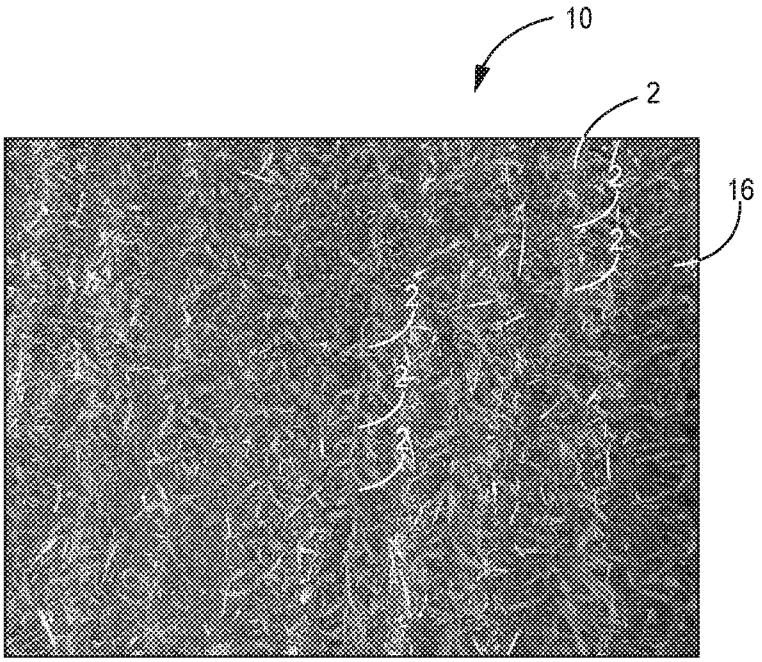
FIG. 11A is an exemplary frame of image obtained from a ground based camera.
Figure 11B:
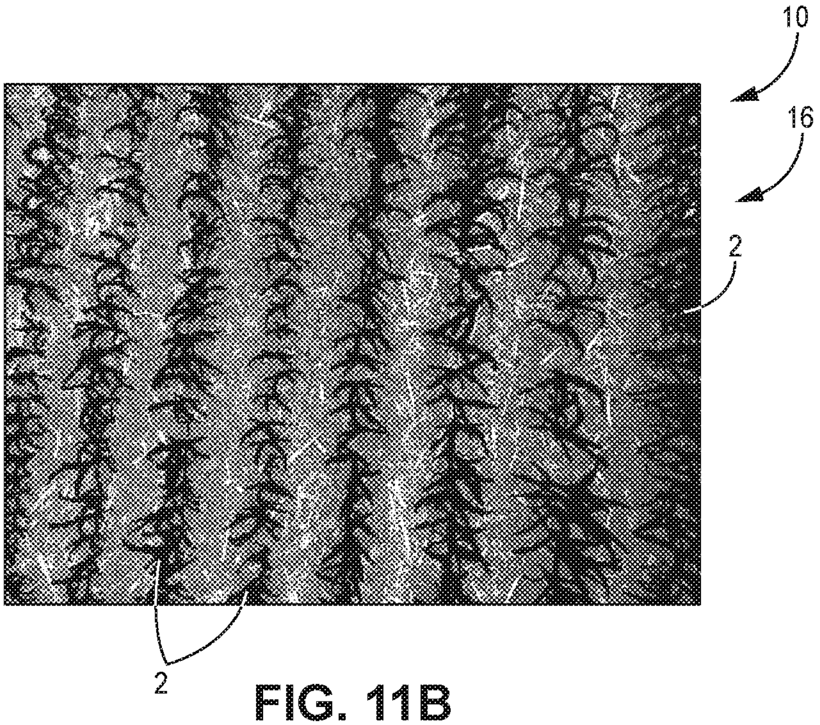
FIG. 11B shows the image obtained in FIG. 11A where the pixels/portions of the imagery that contain green pixels have been marked in a contrasting color for ease of representation, according to one implementation of the system.

As noted above, with prior known approaches plants themselves cause difficulties in stitching a mosaic of images together, so in another optional step of the disclosed process, the plants are removed from the image (box 114). That is, the pixels/portions of the images 16 depicting plants 2 are removed/marked before starting the stitching process. In various implementations, removing the plants 2 from each image is done by identifying each pixel that is green and removing or making those green pixels as transparent or by marking the pixel with a contrasting color such as shown in FIGS. 11A-B. As would be appreciated pixels are marked with a color value, such as an HSV value described above, and certain of these values will correspond to the color green. As such, the system 10 may identify those pixels that have values corresponding to the color green to remove those pixels. Additional color values common to plants of interest may also be used by the system as would be readily understood.

By removing or marking these plant pixels, they are ignored by the image stitching software in further steps. FIG. 11A shows one exemplary frame of imagery 16 obtained from a ground based camera 12. In FIG. 11B those pixels/portions of the imagery that contain green pixels/matter have been marked in a contrasting color for ease of representation, although it would be appreciated these pixels may be altogether removed (box 114) or marked as transparent by the system 10. After the plant pixels have been removed (box 114), the images are now ready to be stitched (box 118) together to create the base of the orthomosaic map.

In these implementations, in another optional step, the buffer of altered images is retained (box 112) and can be used in conjunction with these steps and sub-steps as well. For example, these altered images can be used to troubleshoot stitching (box 118) errors or allow for alternate stitching or processing techniques to be applied at a later time. The buffer of altered images (box 112) may include images where the implement vehicle portions have been removed, images where shadows have been removed, images where plants have been removed, and/or images with any combinations of the foregoing alterations.

In a further optional step, the image data 16 such as plant-free imagery 16 is stitched together via various known stitching techniques/algorithms (box 118). As would be appreciated stitching uses matching features or patterns in each frame to align the frames into a single larger picture/image/map, and it would be readily appreciated by those of skill in the art. Image data derived from the one or more camera(s) can be stitched together to generate a cohesive map/image according to the disclosed implementations.

As would be generally understood, when stitching (box 118) two images, the system identifies features in each image to be stitched. The system then matches overlapping features between the images. Next, the system 10 transforms and/or warps the a second image to minimize the position differences between the matching features between a first and second image. Finally, the system joins the warped second image data to the first image and create a new, larger image. These steps may be executed iteratively to join/stitch a large number of images together.

Stitching processes are commonly used to generate large panoramic images from multiple smaller images, and would be appreciated by those of skill in the art. Images having certain common feature of components can be aligned such as to provide a panoramic and/or higher resolution image by mapping the common features shared between the images to each other. For example, distinctive features in two or more images are found and matched to determine where the images overlap and thereby create a larger image containing both overlapping and non-overlapping portions. Stitching (box 118) can be performed iteratively or for many images at once all with common feature such as to create a large cohesive image, such as a map.

In these implementations, the soil and crop residue have sufficient visual structure for a mapping software, such as Pix4Dmapper, to stitch together a 2D orthomosaic map from the processed image data.

In further implementations, metadata such as the GPS location of the camera 12 when each image 16 is taken (or other metadata) can be used to enhance the accuracy of the stitching according to this step. That is, certain pixels or portions of an image can be given a GPS location such that the GPS locations in multiple images can be aligned to allow for creation of a stitched image. Further, in certain implementations, geometric distortion of the camera lens may also be recorded and compensated when stitching the images, as would be understood.

As a further example, and as discussed above in relation to FIG. 6, in certain implementations, motion of the camera(s) 12 may be recorded by an IMU 34, optionally also including one or more of an accelerometer and a gyrometer. As previously noted, a ground vehicle 1 driving over uneven terrain can cause a change in the relative position between a camera and the ground due to the motion of the suspension and inertial forces. This can lead to inaccuracies in the estimated camera position and alter the field of view of the camera. The relative motion and related inaccuracies can become quite large on flexible structures such as a sprayer boom, as would be appreciated in light of this disclosure. This motion can be measured and positions estimated by the use of an IMU.

In various implementation, the IMU 34 readings can be used individually or combined with GNSS 18 position data using a Kalman filter, or other appreciated technique, to enhance the estimated accuracy of the camera 12 position. Additionally or alternately, many sprayers use radar or ultrasonic distance sensors to measure and control the boom height over the ground, these sensors can be utilized to estimate the position of cameras mounted along the boom. This data may also be used in combination with GNSS 18 and IMU 34 data to determine the location of the camera 12. As discussed above the location of the camera can be recorded as metadata (box 104) and used to enhance the accuracy of stitching (box 118) the images, as well as identifying the location of and/or pixels containing the implement, vehicle, and/or shadow thereby assisting in pre-processing (box 105)

Another optional step includes reintroducing plant pixels into the stitched image (box 120) to generate the final 2D map (box 122). In this optional step, the system 10 is configured to determine the portion of the image that is overhead, this is, the portion of the image where the plants are in view directly overhead and not at a substantial angle, as would be understood. This overhead angle perspective is the most useful for showing the separation between individual plants. In alternative implementations, other angles may be used where they are more advantageous for different types of analysis.

Figure 12A:
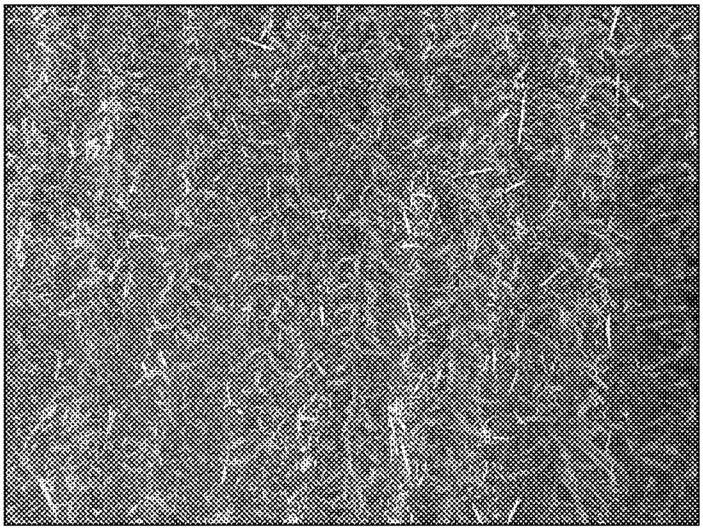
FIG. 12A shows an exemplary image frame, according to one implementation.
Figure 12B:
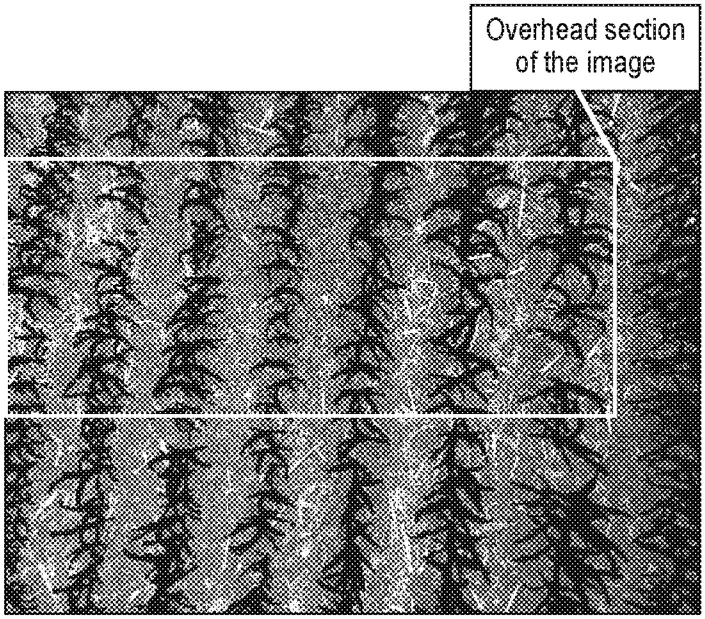
FIG. 12B shows the section of the image considered to be overhead, with plant pixels removed, according to one implementation.

It would be understood that the section of the frame that contains the overhead angle depends on the mounting location of the camera 12 and could be determined after the installation is complete. In certain implementation the portion of the imagery containing the overhead angle is user selected, while in other implementations it is selected by the system 10 automatically and may or may not be presented to a user for confirmation. FIG. 12A shows an exemplary image frame and FIG. 12B shows the section of the image considered to be overhead, with plant pixels removed.

Figure 13:
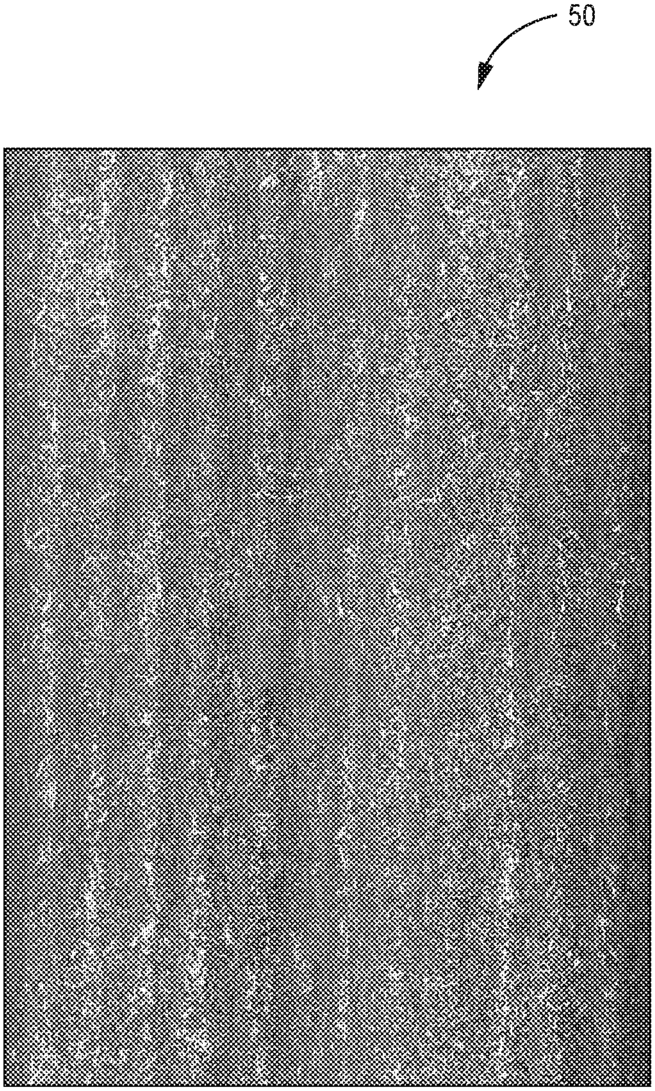
FIG. 13 a 2D orthomosaic map produced by the system, according to one implementation.

Also in this step, the plant pixels from the portion of the image considered to be overhead, or at another selected angle, are introduced/reintroduced into the stitched image (box 120) such as to create a stitched 2D orthomosaic map having soil, crop residue, and plants shown (box 122). An exemplary 2D orthomosaic map 50 is shown in FIG. 13. Optionally, the orthomosaic image 50 is georeferenced using the gathered GNSS portion information (box 104). That is, an entire 2D image 50 of the field(s) is created (box 122) without the blurriness and distortions common in prior known techniques, while keeping processing requirements to a minimum by not processing extraneous data to create 3D images.

A further advantage of the disclosed system 10, is that because a single image of each plant is used in the final map, the effect of wind or other forces moving the plants is reduced, further creating a clear and undistorted image of the field(s) at a given point in time.

Figure 14:
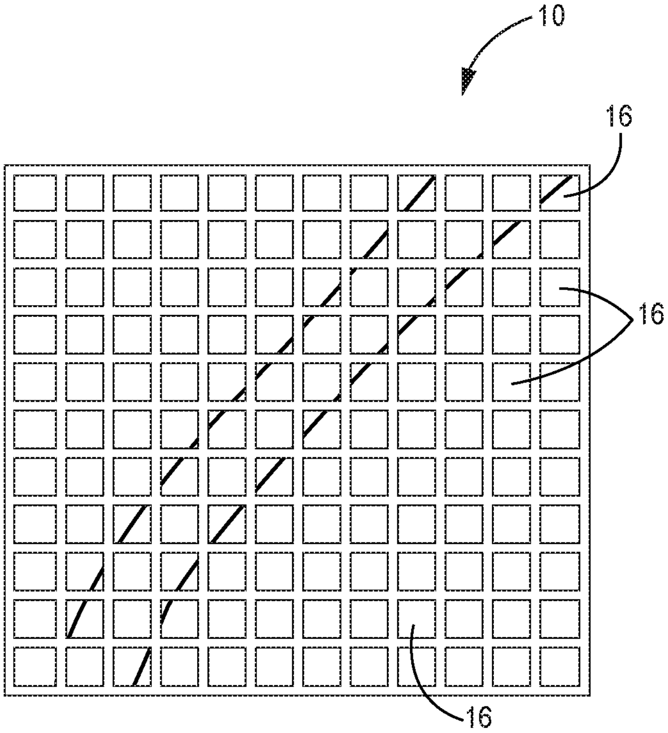
FIG. 14 is a digital image overview of a further stitching implementation.

In an alternative implementation, the system 10 is configured to capture non-overlapping, overhead images to create a 2D orthomosaic map, as shown for example in FIG. 14. These non-overlapping, overhead images can also be joined together using GNSS 18/GPS position references similar to the processes as described above but accounting for the non-overlapping nature of the raw image data. That is, the images are aligned based on known location data and not using common features in the images. In these and other implementations, the camera(s) 12 can be configured to take images at selected intervals based on ground speed, vehicle motion information from an inertial measurement unit 34 or other sensor, and/or GPS position information or other metadata, as would be readily appreciated.

In these and other implementations, selection and removal of plant pixels is not needed, while implement 14 and vehicle 1 structure removal may still be executed. Removal of vehicle 1 and implement 14 shadows may or may not be executed depending on the intended usage of the finished map. While the final map, in these implementations, may not provide total coverage of the imaged field it will still provide useful trends and information on how conditions vary across the field.

In another alternative implementation, overlapping images are taken but the only those portions of the images considered to be overhead and not overlapping are stitched together. In these implementations, no image matching or pattern recognition is required to stitch a contiguous map together.

The 2D orthomosaic map generated by the system 10 can be analyzed for plant population, diseases, stress, and the like, as would be readily appreciated by those of skill in the art.

In certain implementations, the system utilizes artificial intelligence to dynamically update the defined thresholds, including but not limited to HSV and other pixel identification thresholds discussed herein. Machine learning algorithms are trained on historical data to analyze patterns and identify correlations between input parameters and system performance. These algorithms are then used to continuously monitor the system and make adjustments to the various thresholds and parameters in real-time. Certain implementations utilize a combination of rule-based and machine learning approaches, where a set of predefined rules are used to adjust the thresholds in specific situations, while machine learning algorithms are used to optimize the thresholds in other scenarios. Additionally, the system can also be configured to receive feedback from users and use this feedback to make further adjustments to the thresholds. This allows for a more adaptive and responsive system that can continuously improve its performance over time.

Although the disclosure has been described with reference to preferred embodiments, persons skilled in the art will recognize that changes may be made in form and detail without departing from the spirit and scope of the disclosed apparatus, systems and methods.

What is claimed is:

1. A system for generating a 2D orthomosaic map of a field, comprising:

a) at least one camera mounted to a ground vehicle; and b) a processing unit, wherein the processing unit is configured to:

record image data from the at least one camera;

pre-process the recorded image data to yield pre-processed image data by:

i) identifying and removing implement structure pixels and/or shadow pixels from the recorded image data; and ii) identifying and removing plant pixels from the recorded image data, wherein the removal of pixels is accomplished by setting the identified pixels to be transparent and/or to a different color value;

process the pre-processed image data via a stitching algorithm executed by the processing unit into the 2D orthomosaic field map; and reintroduce the removed plant pixels to the 2D orthomosaic field map.

2. The system of claim 1, further comprising forming a buffer of unaltered images.

3. The system of claim 1, further comprising incorporating metadata into the image data and 2D orthomosaic map.

4. The system of claim 3, wherein the metadata is at least one of IMU metadata, GNSS metadata, timestamp metadata, and GPS metadata.

5. The system of claim 1, wherein the identification and removal of implement structure pixels and/or shadow pixels in the pre-processing of the recorded image data is performed via applying hue, saturation, and luminance (HSV) thresholds to the HSV values of the recorded image data.

6. The system of claim 1, wherein the stitching algorithm comprises identifying features in the pre-processed image data.

7. A method for generating a 2D orthomosaic map comprising:

obtaining a series of images of a field from a camera located on a ground-based vehicle;

processing the series of images to mark pixels in which the ground-based vehicle is visible;

identifying and removing pixels containing plants in the series of images, wherein the removal of pixels is accomplished by setting the identified pixels to be transparent and/or to a different color value;

stitching together the series of images into the 2D orthomosaic map; and reintroducing the pixels containing plants into the 2D orthomosaic map.

8. The method of claim 7, further comprising identifying shadow pixels.

9. The method of claim 8, wherein the shadow pixels are identified by the pixels having a luminance value consistently lower than the average luminance of pixels in the overall image.

10. The method of claim 8, further comprising removing the shadow pixels from the series of images.

11. The method of claim 7, further comprising recording metadata including one or more of inertial measurement unit (IMU) data, global navigation satellite systems (GNSS) data, vehicle orientation data, time data, and weather data with the series of images.

12. The method of claim 7, further comprising removing the pixels in which the ground-based vehicle is visible.

13. The method of claim 7, wherein the pixels showing plants from an overhead view are selected to be reintroduced to the 2D orthomosaic map.

14. A method for generating a field map comprising:

recording image data from a camera on a ground-based vehicle;

preprocessing the image data comprising:

identifying pixels as plant pixels, vehicle pixels, and shadow pixels, in the image data; and removing the vehicle pixels and the shadow pixels from the image data, wherein the removal of pixels is accomplished by setting the identified pixels to be transparent and/or to a different color value;

processing the image data comprising:

removing plant pixels from the image data;

stitching the image data into the field map; and reintroducing the plant pixels into the field map; and saving the field map for analysis.

15. The method of claim 14, further comprising recording metadata from the ground-based vehicle and the camera with the image data, the metadata including one or more of inertial measurement unit (IMU) data, global navigation satellite systems (GNSS) data, vehicle orientation data, time data, and weather data.

16. The method of claim 14, further comprising buffering the image data to maintain altered and unaltered copies of the image data.

17. The method of claim 14, wherein plant pixels in the image data are identified by using hue, saturation, and luminance values (HSV) measured for the pixels in the image data.

18. The method of claim 14, wherein the plant pixels from an overhead view are selected to be reintroduced to the 2D orthomosaic map.

19. The method of claim 14, wherein the shadow pixels are identified by a luminosity pattern.

* * * * *